(12) United States Patent
Avison et al.

(10) Patent No.: US 8,730,571 B2
(45) Date of Patent: May 20, 2014

(54) WINDOW FILMS WITH REFLECTIVE ORGANIC AND METAL LAYERS

(75) Inventors: David W. Avison, Townsend, MA (US); Steven A. Carlson, Cambridge, MA (US); Peter K. Barrett, Rockville, MD (US)

(73) Assignees: Madico, Inc., Woburn, MA (US); Optodot Corporation, Woburn, MA (US)

( * ) Notice: Subject to any disclaimer, the term of this patent is extended or adjusted under 35 U.S.C. 154(b) by 268 days.

(21) Appl. No.: 13/052,991

(22) Filed: Mar. 21, 2011

(65) Prior Publication Data

US 2011/0228385 A1    Sep. 22, 2011

Related U.S. Application Data

(63) Continuation of application No. PCT/US2009/057929, filed on Sep. 22, 2009.

(60) Provisional application No. 61/192,951, filed on Sep. 22, 2008, provisional application No. 61/210,214, filed on Mar. 16, 2009.

(51) Int. Cl.
    *F21V 9/04* (2006.01)
(52) U.S. Cl.
    USPC .......................................................... 359/360
(58) Field of Classification Search
    USPC ................... 359/614, 359, 360, 599, 577–590
    See application file for complete search history.

(56) References Cited

U.S. PATENT DOCUMENTS

| 4,512,864 A | 4/1985 | Gillery |
| 4,782,216 A | 11/1988 | Woodard |
| 5,412,274 A | 5/1995 | Parham |
| 6,248,815 B1 | 6/2001 | Papsin et al. |
| 6,650,478 B1 * | 11/2003 | DeBusk et al. ............... 359/585 |
| 6,997,981 B1 * | 2/2006 | Coombs et al. ............... 106/415 |
| 7,008,979 B2 | 3/2006 | Schottman et al. |
| 7,715,095 B2 * | 5/2010 | Carlson et al. ............... 359/350 |
| 2007/0097510 A1 | 5/2007 | Carlson |
| 2012/0069429 A1 * | 3/2012 | Barrett et al. ................. 359/360 |

FOREIGN PATENT DOCUMENTS

WO    2010034030 A1    3/2010

OTHER PUBLICATIONS

U.S. Appl. No. 13/052,996, Peter K. Barrett et al., System for Filtering Radio Frequency and Infrared Optical Transmissions, filed Mar. 21, 2011.
International Search Report, dated Mar. 25, 2010, received in International Patent Application No. PCT/ US2009/057929, 2 pgs.
International Preliminary Report on Patentability, dated Mar. 22, 2011, received in International Patent Application No. PCT/US2009/057929, 6 pgs.

* cited by examiner

*Primary Examiner* — Jennifer L. Doak
*Assistant Examiner* — Tamara Y Washington
(74) *Attorney, Agent, or Firm* — Finch & Maloney PLLC

(57) ABSTRACT

A system and method for windows films having one or more layers incorporating an organic free radical compound, wherein the layers reflect in the infrared region, and one or more layers of a multilayer interference stack of a metal/metal or metal/metal oxide design. Preferably, the organic free radical compound is a salt of an aminium radical cation. One or more layers of the multilayer interference stack may incorporate an aminium radical cation compound. Also provided are security windows that utilize such window films.

22 Claims, 2 Drawing Sheets

WINDOW FILMS WITH REFLECTIVE ORGANIC AND METAL LAYERS

CROSS-REFERENCE TO RELATED PATENT APPLICATIONS

This application is a Continuation of International Application No. PCT/US2009/57929, filed Sep. 22, 2009, and claims the benefit of U.S. Provisional Patent Application No. 61/210,214, filed on Mar. 16, 2009, in the United States Patent and Trademark Office, and U.S. Provisional Patent Application No. 61/192,951, filed on Sep. 22, 2008, in the United States Patent and Trademark Office. The entire contents of these applications are incorporated herein by reference.

FIELD OF THE INVENTION

The present invention relates generally to the field of window films, and particularly, pertains to security window films that block the transmission of radio frequency and infrared radiation. More specifically, this invention pertains to window films comprising one or more reflective organic layers and one or more reflective metal layers. This invention also pertains to methods of making a window film by utilizing the reflective organic and metal layers.

BACKGROUND OF THE INVENTION

There is a growing need for windows or other visually transparent openings in buildings that block against electromagnetic and infrared radiation in order to prevent the undesired collection of data from computer devices in the buildings. The level of blocking of electromagnetic and infrared radiation to provide the desired anti-surveillance security can vary over a wide range depending on the different security requirements. For the highest level of blocking, such as blocking of greater than 99% of the infrared radiation, one challenge is to maintain an acceptable and as high as possible a transmission of visible light so that the normal function of the window for clarity and haze-free viewing is still provided.

Since the 1990's, conductive glass windows from Pilkington have been sold under the trade name of DATASTOP for shielding against electromagnetic radiation in both laminated glass and insulating glass units. These conductive glass windows provide electromagnetic shielding for all but the most demanding data security applications, but do not provide sufficient infrared shielding for most anti-surveillance applications.

U.S. Pat. Nos. 6,859,310, 6,891,667, 7,177,075, 7,295,368 and 7,405,872 describe various approaches to designing security windows using a highly electrically conductive filter layer of a plurality of dielectric and metal layers.

It would be advantageous to have a security window design that provides a combination of electromagnetic and infrared shielding for the most demanding anti-surveillance applications and high visible light transmittance and clarity. For solar control window film applications in general, it would be advantageous to have window films for lamination to a window that provide a combination of high reflection and blocking of infrared radiation and high visible light transmittance and clarity.

SUMMARY OF THE INVENTION

This invention pertains to solar control window films that block the transmission of infrared radiation, preferably by reflection, and also are capable of blocking the transmission of radio frequency radiation. Preferably, the window films comprise at least one layer of an organic free radical compound that is reflective at a range of wavelengths in the infrared and at least one multilayer interference stack of a metal/metal or a metal/metal oxide design where the index of refraction of alternating layers is varied to provide a desired infrared reflectance and blocking.

One aspect of various embodiments of this invention pertains to a window film comprising one or more layers comprising an organic free radical compound that is reflective at a range of wavelengths in the infrared and one or more layers of a multilayer interference stack.

In one embodiment, at least one of the one or more layers of a multilayer interference stack comprises alternating layers of a first metal and a second metal where the index of refraction of alternating layers is varied. In one embodiment, at least one of the one or more layers of a multilayer interference stack comprises alternating layers of a metal and a metal oxide where the index of refraction of alternating layers is varied. In one embodiment, the window film comprises two layers comprising an organic free radical compound that is reflective at a range of wavelengths in the infrared. In one embodiment, the window film comprises two layers of the multilayer interference stack. In one embodiment, at least one of the two layers of the multilayer interference stack comprises alternating layers of a first metal and a second metal where the index of refraction of alternating layers is varied. In one embodiment, at least one of the two layers of the multilayer interference stack comprises alternating layers of a metal and a metal oxide where the index of refraction of alternating layers is varied. In one embodiment, the window film comprises (a) two layers comprising an organic free radical compound that is reflective at a range of wavelengths in the infrared and (b) two layers of a multilayer interference stack. In one embodiment, one of the layers of the multilayer stack is positioned between the outside of the building and the one or more layers comprising an organic free radical compound that is reflective at a range of wavelengths in the infrared.

In one embodiment of the window films of this invention, the organic free radical compound is an aminium radical cation compound. In one embodiment, the aminium radical cation compound is a salt of an aminium radical cation, wherein the anion of the salt is selected from the group consisting of hexafluoroantimonate and hexafluorophosphate. In one embodiment, the aminium radical cation compound is a salt of a tetrakis(phenyl)-1,4-benzenediamine radical cation. In one embodiment, the aminium radical cation compound is a salt of a tris(phenyl)-aminium radical cation.

In one embodiment of the window films of this invention, at least one of the one or more layers comprising an organic free radical compound exhibit a reflectance peak in the infrared region from 800 to 1400 nm. In one embodiment, at least one of the one or more layers comprising an organic free radical compound exhibit two reflectance peaks in the infrared region from 800 to 1700 nm. In one embodiment, the optical density spectrum of at least one of the one or more layers comprising an organic free radical compound exhibits a peak in the infrared region from 840 to 880 nm and, optionally, exhibits a second peak in the infrared region from 1250 to 1350 nm. In one embodiment, the percent transmission of at least one of the one or more layers comprising an organic free radical compound exhibits a minimum percent transmission peak of less than 20% in the infrared region from 840 to 880 nm and, preferably, further exhibits a percent transmission of less than 40% at 800 nm.

Still another aspect of various embodiments of the present invention pertains to a security window, wherein the security window comprises one or more glass substrates and a window film, wherein the window film comprises (a) one or more layers comprising an organic free radical compound that is reflective at a range of wavelengths in the infrared and (b) one or more layers of a multilayer interference stack comprising alternating layers of a first metal and a second metal where the index of refraction is varied.

Another aspect of various embodiments of the present invention pertains to a security window, wherein the security window comprises one or more glass substrates and a window film, wherein the window film comprises (a) one or more layers comprising an organic free radical compound that is reflective at a range of wavelengths in the infrared and (b) one or more layers of a multilayer interference stack comprising alternating layers of a metal and a metal oxide where the index of refraction is varied.

Another aspect of various embodiments of the present invention pertains to a method of blocking transmission of radiation. The method includes providing a first substrate including a first multilayer interference stack thereon, and layering a first layer of an organic free radical compound that is reflective at a range of wavelengths in the infrared on the first multilayer interference stack on the first substrate.

The layering of the first layer of the organic free radical compound may include coating the organic free radical compound onto a second substrate and laminating the second substrate onto the first substrate. The layering of the first layer of the organic free radical compound may include coating the organic free radical compound on the first substrate.

The method may further include coating the first multilayer interference stack on the first substrate, layering a second layer of the organic free radical compound on the first substrate, or layering a second multilayer interference stack on the first substrate.

The method may further include coating an adhesive on the first substrate, coating a scratch-resistant coating on the first substrate, or mounting the first substrate on a window.

The organic free radical compound may be on the side of the first multilayer interference stack away from a source of the radiation.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF THE INVENTION

Figure 1:
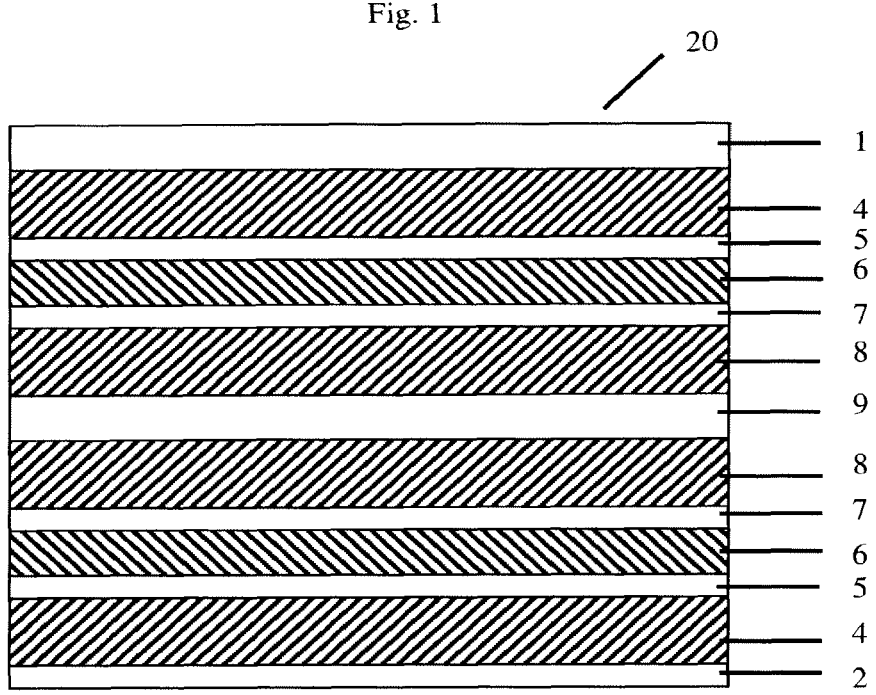
FIG. 1 shows a schematic cross-sectional view of a window film according to an embodiment of the present invention.

In the following detailed description, only certain exemplary embodiments of the present invention have been shown and described, simply by way of illustration. As those skilled in the art would realized, the described embodiments may be modified in various different ways, all without departing from the spirit or scope of the present invention. Accordingly, the drawings and description are to be regarded as illustrative in nature and not restrictive. Like reference numerals designate like elements throughout the specification.

This invention pertains to window films that block the transmission of infrared radiation and, preferably, comprise a layer of an organic free radical compound that is reflective at a range of wavelengths in the infrared, and a multilayer interference stack of a metal/metal or a metal/metal oxide design where the index of refraction of alternating layers is varied to provide a desired infrared reflectance and blocking Organic Free Radical Compounds The term "organic free radical compound," as used herein, pertains to an organic compound which comprises at least one free unpaired electron on an atom, such as, for example, a carbon atom, a nitrogen atom, or an oxygen atom, in the ground state of the organic compound. Suitable organic free radical compounds for the infrared blocking layers, solar control window films, anti-surveillance security windows, and other product applications of various embodiments of the present invention include neutral organic free radicals, salts of organic free radical cations, and salts of organic free radical anions. For purposes of brevity, the terms "organic free radical cation," "organic radical cation," and "radical cation" are used interchangeably herein. The word "cation," as used herein, pertains to a positively charged atom in a molecule, such as, for example, a positively charged nitrogen atom. The word "anion," as used herein, pertains to a negatively charged atom in a molecule, such as, for example, a negatively charged oxygen atom. It should be noted that the free unpaired electron and the positive and negative charges of the organic free radical compounds may be localized on a single atom or shared among more than one atom.

Examples of suitable salts of organic free radical cations for the infrared blocking layers, solar control window films, security windows, and other product applications of various embodiments of this invention include, but are not limited to, salts of aminium radical cations, such as, for example, tris (p-dibutylaminophenyl) aminium hexafluoroantimonate, which is commercially available as IR-99, a trade name for a dye available from Sperian Protection, Smithfield, R.I. An equivalent chemical name for IR-99, used interchangeably herein, is the hexafluoroantimonate salt of N,N-dibutyl-N', N'-bis[4-(dibutylamino)phenyl]-1,4-benzenediamine radical cation. IR-99 is known to be a stable material that may exist in a layer of material, such as in a polymeric coating, under normal room conditions for an extended period of time. Another suitable salt of an aminium radical cation compound is IR-165, which is a trade name for a dye available from Sperian Protection, Smithfield, R.I. IR-165 is the hexafluoroantimonate salt of a tetrakis(phenyl)-1,4-benzenediamine radical cation. IR-165 is likewise known to be stable in the dry powder form and in a layer of material, such as in a polymer-containing coating, under ambient room conditions for extended periods of time, such as for many years. These compounds are used in various embodiments of the present invention because of their infrared reflectance, high visible transparency, and excellent stability to light and heat.

Coatings comprising aminium radical cation compounds have been found to exhibit high levels of reflectance in the infrared, as described in U.S. Pat. No. 7,151,626, to Carlson, and in U.S. Pat. Publ. Applic. No. 20070097510 to Carlson et al. Layers comprising IR-165 have a much lower absorption in the 400 to 700 nm wavelength region of the visible than does IR-99 for a comparable amount of infrared blocking, and thus are preferred for window applications where high visible transmission is desired.

The terms "infrared," "infrared region," "near-infrared wavelength region," "near-infrared wavelength," and "near-infrared," are used interchangeably herein, and pertain to wavelengths from 700 nm to 2500 nm. The terms "visible wavelength region," "visible wavelength," "visible region," and "visible," are used interchangeably herein and pertain to wavelengths from 400 to 700 nm.

Suitable salts of organic radical cations for the infrared blocking layers, solar control window films, security windows, and other product applications of various embodiments of this invention include, but are not limited to, salts of an aminium radical cation compound. The choice of the counteranion for the salt depends on a variety of factors such as, for example, the ease and cost of applying the infrared blocking layer and the required stability of any infrared blocking layers where the organic radical cation salt is utilized, against degradation by oxygen, moisture, and photon exposures.

Chart 1 shows the chemical structure of IR-99, a representative free radical compound for the infrared blocking layers of this invention. IR-99 is an example of a salt of a tris (4-dialkylaminophenyl) aminium radical cation.

Chart 1

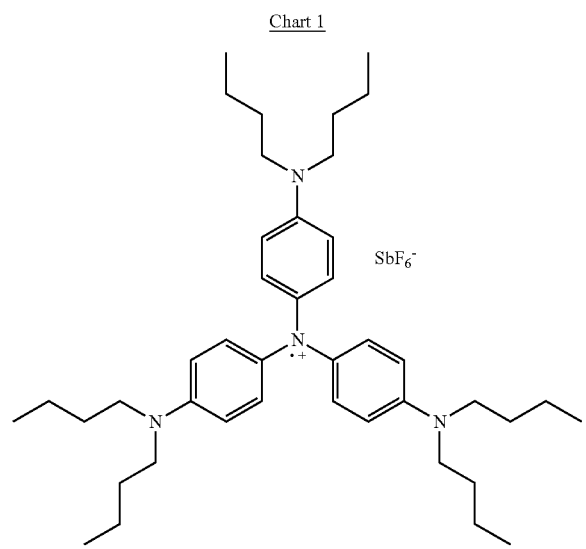

IR-99 for Infrared Blocking Layers

It can be seen in Chart 1 that IR-99 is an organic free radical compound with a single free electron shown on one of the nitrogen atoms. It is present in a salt form with a hexafluoroantimonate anion in this case.

In one embodiment of the window films of various embodiments of this invention, the aminium radical cation compound is a salt of an aminium radical cation, wherein the anion of the salt is selected from the group consisting of hexafluoroantimonate and hexafluorophosphate. In one embodiment, the aminium radical cation compound is a salt of a tetrakis(phenyl)-1,4-benzenediamine radical cation. In one embodiment, the aminium radical cation compound is a salt of a tris(phenyl)-aminium radical cation.

Multilayer Interference Stacks

Layers of multilayer interference stacks on plastic films, such as polyester films, are sold for use in solar control window films because of their high level of infrared reflectance and blocking and their relatively high visible light transmission. Because of their high electrical conductivity, they also provide some shielding of electromagnetic radiation. An example of this type of multilayer interference stack on polyester film is XIR-70, the trade name for a window film available from Southwall, Palo Alto, Calif. Typically, these multilayer interference stacks are comprised of alternating layers of a first metal and a second metal where the alternating layers vary in the index of refraction. One of the metals typically used is silver. As an alternative, the second metal layer in the interference stack may be replaced by a metal oxide. These window films typically have low electrical resistances of less than 10 ohms per square and sometimes of less than 4 ohms per square. These window films with interference stacks typically have strong infrared reflectance and blocking properties above 850 nm, but are not nearly as strong in blocking at 750 nm to 850 nm, which are wavelengths with significant solar infrared radiation to be blocked and also represent the low end of the blocking wavelengths required in many data security and anti-surveillance window applications.

Window Films

The window films of various embodiments of the present invention comprise (a) one or more layers of an organic free radical compound that is reflective in the infrared and (b) one or more layers of a multilayer interference stack of a metal/metal and/or a metal/metal oxide design, as described herein.

The layer of an organic free radical compound typically contains the organic free radical compound, such as the salt of an aminium compound, and a polymeric binder, such as for example a urethane polymer at a 30:70 ratio by weight to the amount of organic free radical compound, for added adhesion and cohesion of the coating layer. This layer is coated onto a substrate, such as a polyethylene terephthalate or polyester film as is commonly used in solar control window films, or is coated on another coating layer on a substrate, such as a polyester film. Thus, the organic free radical compound, such as the aminium compound, is present in a distinct single coating layer on the surface of a substrate or on another coating layer that is on a substrate.

Similarly, the multilayer interference stack layer is coated in the multiple layers of the stack layer onto a substrate, such as a polyester film, or is coated on another coating layer that is on a substrate, such as a polyester film.

In another embodiment, it has been found that a layer of an aminium compound, such as for example IR-165 in a polymer, can provide enhanced infrared interference reflectance when incorporated as one of the layers, preferably the top layer, in a multilayer interference stack of alternating layers of two different metals or of a metal and a metal oxide or of the aminium compound with a single metal. The high index of refraction of the layer with the aminium compound, such as over 2.0 in the infrared wavelength region, contributes to the increased interference reflectance, particularly in the infrared from about 800 to 1400 nm, for these organic/metal or organic/metal/metal oxide multilayer interference stacks.

The window films of various embodiments of this invention can be fabricated into any window film and glass configuration known in the art, such as, for example, into laminated glass windows using a polyvinyl butyral (PVB) polymer to laminate the glass substrates to other layers of the window or into insulating glass or thermopane configurations where there is an air gap in the interior of the window. One of the advantages of the layers of an aminium radical cation compound, such as IR-165, of this invention is that they are stable to the high heats utilized in laminating glass with PVB and other polymers. When the window films of this invention are utilized in a security window application, the window films may be connected electrically to the metal frame of the window by methods known in the art of DATASTOP and other anti-surveillance windows. The metal frame in turn should be connected to the electromagnetic shielding material in the wall.

Another example of various embodiments of fabricating the window films of the present invention into window film and glass configurations known in the art is the retrofit application of laminating the window film to an existing glass or plastic window. To do this lamination, a mounting adhesive coating is applied to the side of the window film that is to be mounted on the window. The window film of such an embodiment of this invention typically has the multilayer interference stack on a polyester film substrate. The side of the polyester film with the multilayer interference stack is laminated with a pressure sensitive adhesive, preferably with a silicone pressure sensitive adhesive for enhanced stability of the organic free radical layer, to a layer of the organic free radical compound, which is typically also on a polyester film substrate. Where there are two multilayer interference stacks and two organic free radical layers in the window film, the two organic free radical layers may be on opposite sides of a polyester film substrate or, alternatively, each organic free radical layer may be on a separate polyester film substrate that is first laminated to the multilayer interference stack side of another polyester film substrate and then the two organic free radical layer/multilayer interference stack laminates are laminated together on the sides of the laminates that are closest to the organic free radical layers.

Alternatively, one organic free radical layer on a separate polyester film substrate may be laminated using a pressure sensitive adhesive to the organic free radical layer on a second separate polyester film substrate. The resulting laminate may then be laminated using a polyester adhesive on one or both sides to a multilayer interference stack on another polyester film substrate to form a window film.

For mounting the window film to a window, one side of the final laminate may be coated with the mounting adhesive layer and, typically, the other side of the laminate is coated with a scratch resistant coating to prevent scratching of the mounted window film during installation and during subsequent cleaning and use from the interior of the building.

Preferably, one of the one or more layers of the multilayer interference stack is positioned between (1) the outside of the building or other enclosure that is being protected from solar heat buildup and/or from surveillance from the outside and (2) the one or more layers comprising an organic free radical compound that is reflective at a range of wavelengths in the infrared. Besides buildings, examples of other enclosures that may utilize the security windows of this invention include, but are not limited to, rooms, cabinets, instrument panels, and computer screens. Because the layer of the multilayer interference stack is typically highly reflective in the infrared and has some absorption of the infrared, this configuration enhances the total amount of reflection of the infrared radiation that reaches to the outside from the other layers and, where necessary, keeps the absorption of the infrared radiation, such as from the sun, down, in order to prevent heat buildup in the glass that might contribute to cracking of the glass.

In the window films of various embodiments of the present invention, it is preferred to use two layers of the organic free radical compound in order to make the layers thinner and to have less overall haze in the window film, while achieving the desired level of infrared blocking. The one or more layers of the organic free radical compound, such as a salt of an aminium radical cation compound, are primarily present to provide effective shielding in the infrared in the region of 700 to 850 nm, and particularly around 800 nm to 850 nm, without significantly decreasing the visible light transmittance and clarity. For example, in the window films of various embodiments of this invention, about 35 to 70% of the infrared blocking at 800 nm is typically provided by the one or more layers of the organic free radical compound. In one embodiment, at least one of the one or more layers comprising the organic free radical compound has a reflectance peak in the 800 to 1400 nm wavelength region of the infrared, and preferably has two reflectance peaks in the 800 to 1700 nm wavelength region of the infrared. Typically, the % reflectance at these peaks is above 20% and may be over 30% at one of the peaks.

In one embodiment of the window films of this invention, the optical density spectrum of at least one of the one or more layers comprising an organic free radical compound exhibits a peak in the infrared region from 840 to 880 nm and, optionally, exhibits a second peak in the infrared region from 1250 to 1350 nm. In one embodiment, the percent transmission of at least one of the one or more layers comprising an organic free radical compound exhibits a minimum percent transmission peak of less than 20% in the infrared region from 840 to 880 nm and, preferably, further exhibits a percent transmission of less than 40% at 800 nm.

Although high visible transmission is normally preferred, there are window film applications where increased solar energy rejection is desirable. One approach to achieve this is to add visible dyes or pigments to the window film, such as, for example, incorporating them in one or more of the layers comprising the organic free radical compound.

FIG. 1 shows a cross-section view of one embodiment of the window films of this invention. The window film 20 has a mounting adhesive layer 1 on the side to be mounted on the window and an abrasion resistant coating 2 on the opposite side. The window film 20 further comprises polyester film substrates 4, multilayer interference stack layers 5, pressure sensitive adhesive layers 6, layers 7 comprising a free radical cation compound, polyester film substrates 8, and pressure sensitive adhesive layer 9.

Figure 2:
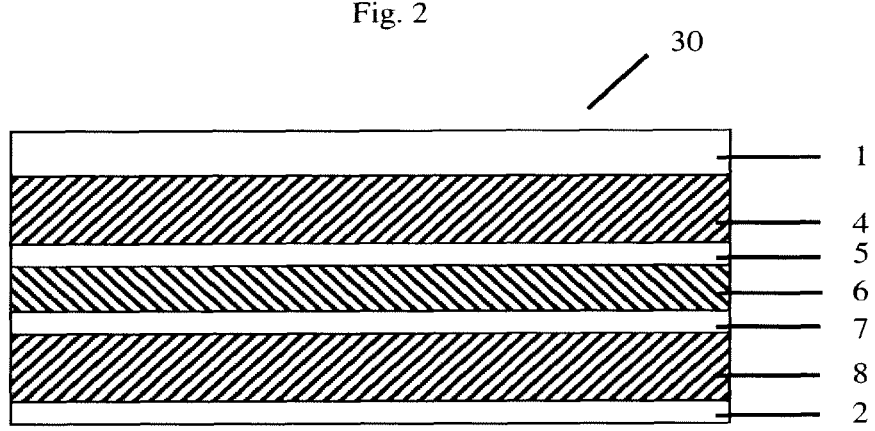
FIG. 2 shows a schematic cross-sectional view of a window film according to another embodiment of the present invention.

FIG. 2 shows a cross-section view of another embodiment of the window films of the present invention. The window film 30 has a mounting adhesive layer 1 on the side to be mounted on the window and an abrasion resistant coating 2 on the opposite side. The window film 30 further comprises a polyester film substrate 4, a multilayer interference stack layer 5, a pressure sensitive adhesive layer 6, a layer 7 comprising a free radical cation compound, and a polyester film substrate 8.

Security Windows

Another aspect of various embodiments of the present invention pertains to a security window, wherein the security window comprises one or more glass substrates and the window film of the present invention, as described herein, wherein the window film comprises (a) one or more layers comprising an organic free radical compound that is reflective at a range of wavelengths in the infrared and (b) one or more layers of a multilayer interference stack, wherein, for example, the multilayer interference stack comprises alternating layers of a first metal and a second metal where the index of refraction is varied, or alternating layers of a metal and a metal oxide where the index of refraction is varied, or alternating layers of an aminium compound and a metal or of an aminium compound and a metal oxide.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A window film, wherein said window film comprises two or more layers comprising an organic free radical compound that are reflective at a range of wavelengths in the infrared, and two or more layers of multilayer interference stacks that are reflective at a range of wavelengths in the infrared and provide electromagnetic shielding, wherein said organic free radical compound is an aminium radical cation compound.

2. The window film of claim 1, wherein at least one of said two or more layers of a multilayer interference stack comprises:
   (a) alternating layers of a first metal and a second metal where the index of refraction of alternating layers is varied; or
   (b) alternating layers of a metal and a metal oxide where the index of refraction of alternating layers is varied.

3. The window film of claim 1 wherein
   (i) at least one of said two layers of a multilayer interference stack comprises alternating layers of a first metal and a second metal where the index of refraction of alternating layers is varied; or
   (ii) at least one of said two layers of a multilayer interference stack comprises alternating layers of a metal and a metal oxide where the index of refraction of alternating layers is varied.

4. The window film of claim 1, wherein one of said two or more layers of a multilayer interference stack is positioned between the outside of a building and said two or more layers comprising an organic free radical compound that is reflective at a range of wavelengths in the infrared.

5. The window film of claim 1, wherein said aminium radical cation compound is:
   (i) a salt of an aminium radical cation, wherein the anion of said salt is selected from the group consisting of hexafluoroantimonate and hexafluorophosphate; or
   (ii) a salt of a tetrakis(phenyl)-1,4-benzenediamine radical cation; or
   (iii) a salt of a tris(phenyl)-aminium radical cation.

6. The window film of claim 1, wherein the resistance of the layer of at least one of said two or more multilayer interference stacks is:
   (i) less than 10 ohms per square; or
   (ii) less than 4 ohms per square.

7. The window film of claim 1, where at least one of said two or more layers comprising an organic free radical compound exhibits:
   (i) a reflectance peak in the infrared region from 800 to 1400 nm; or
   (ii) two reflectance peaks in the infrared region from 800 to 1700 nm.

8. The window film of claim 1, wherein the optical density spectrum of at least one of said two or more layers comprising an organic free radical compound exhibits a peak in the infrared region from 840 to 880 nm and optionally exhibits a second peak in the infrared region from 1250 to 1350 nm.

9. The window film of claim 1, wherein the percent transmission of at least one of said two or more layers comprising an organic free radical compound exhibits a minimum percent transmission peak of less than 20% in the infrared region from 840 to 880 nm; wherein optionally the percent transmission of said at least one of said two or more layers comprising an organic free radical compound is less than 40% at 800 nm.

10. A security window, wherein said security window comprises one or more glass substrates and a window film of claim 2.

11. A method of blocking transmission of radiation, the method comprising:
   providing a first substrate comprising a first multilayer interference stack thereon, wherein the first multilayer interference stack is reflective at a range of wavelengths in the infrared and provides electromagnetic shielding;
   layering a first layer of an organic free radical compound that is reflective at a range of wavelengths in the infrared on the first multilayer interference stack on the first substrate;
   providing a second substrate comprising a second multilayer interference stack thereon, wherein the second multilayer interference stack is reflective at a range of wavelengths in the infrared and provides electromagnetic shielding; and
   layering a second layer of an organic free radical compound that is reflective at a range of wavelengths in the infrared on the second multilayer interference stack on the second substrate, wherein said organic free radical compound is an aminium radical cation compound.

12. The method of claim 11, wherein layering of the first layer of the organic free radical compound comprises coating the organic free radical compound onto a third substrate and laminating the third substrate onto the first substrate.

13. The method of claim 11, wherein the layering of the first layer of the organic free radical compound comprises coating the organic free radical compound on the first substrate.

14. The method of claim 11, the method further comprising coating the first multilayer interference stack on the first substrate.

15. The method of claim 12, wherein layering of the second layer of the organic free radical compound comprises coating the organic free radical compound onto a fourth substrate and laminating the fourth substrate onto the first substrate.

16. The method of claim 11, the method further comprising layering the second multilayer interference stack on the second substrate.

17. The method of claim 11, the method further comprising coating an adhesive on the second substrate on a side opposite to the second multilayer interference stack.

18. The method of claim 11, the method further comprising coating a scratch-resistant coating on the first substrate on a side opposite to the first multilayer interference stack.

19. The method of claim 11, wherein the organic free radical compound is on the side of the first multilayer interference stack away from a source of the radiation.

20. The method of claim 11, the method further comprising mounting the second substrate on a window.

21. The method of claim 15, wherein a side of the fourth substrate opposite to the second layer of the organic free radical compound is laminated to a side of the third substrate opposite to the first layer of the organic free radical compound.

22. The method of claim 12, wherein layering of the second layer of the organic free radical compound comprises:
   coating the second layer of the organic free radical compound onto a side of the third substrate opposite to the first layer of the organic free radical compound; and
   laminating the second substrate to the third substrate on the side of the third substrate that includes the second layer of the organic free radical compound.

* * * * *